United States Patent Office 2,928,850
Patented Mar. 15, 1960

2,928,850

19-NOR-PREGNATRIENE COMPOUNDS AND PROCESSES FOR THEIR MANUFACTURE

Hershel L. Herzog, Mountain View, and Arthur Nobile, Livingston, N.J., assignors to Schering Corporation, Bloomfield, N.J., a corporation of New Jersey No Drawing. Application May 3, 1955
Serial No. 505,835

12 Claims. (Cl. 260—397.45)

This invention relates to a new group of steroidal trienes and to processes for their manufacture. It is an object of this invention to provide a process for the aromatization of the A ring and in a convenient and inexpensive manner. It is a further object of this invention to provide a new group of 19-nor-pregnatrienes which have important therapeutic utility and are useful intermediates in the synthesis of other physiologically active compounds.

We have found that aromatization of the A ring is conveniently performed when 19-nor-3-keto-delta-4 steroids are subjected to the microbiological action of *Corynebacterium simplex* (A.T.C.C. 6946) or *Corynebacterium hoagii* (A.T.C.C. 7005). We have further found this reaction to be generally applicable to 19-nor-3-keto-delta-4 steroids. For example, we have subjected 19-nor-testosterone, 19-nor-delta-4-pregnene-20-ol-3-one, 19-nor-17-alpha-ethinyltestosterone and 19-nor-17-alpha - methyl testosterone to the action of this organism and have isolated beta-estradiol, 19-nor-delta-1,3,5-pregnatriene-3-ol-20-one, 17-alpha-ethinylestradiol and 17-alpha-methyl-estradiol respectively, all of which are active hormonal substances.

This reaction is also applicable to 19-nor-pregnenes containing an oxygen function at C–11. Thus the triene compounds related to cortical hormones of our invention may be represented by the following general formula:

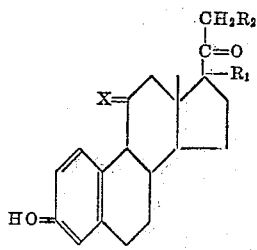

wherein X is a member of the group consisting of

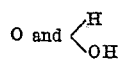

$R_1$ is a member of the group consisting of H and OH, and $R_2$ represents H, OH, and lower acyloxy. The compounds of the general formula exhibit adrenocortical properties and are especially useful where glucocorticoid or mineralocorticoid activity is desired. Thus, the compounds of our invention are useful in treating inflammatory diseases related to arthritis and other syndromes such as Addison's disease.

Specifically, compounds of the general formula wherein X is OH or O, and $R_1$ and $R_2$ are both OH, are themselves useful in the treatment of inflammatory diseases such as arthritis.

The compounds of the general formula, which are devoid of a hydroxyl group at C–17, exhibit moderate glycogenic properties, as determined by standard liver glycogenic assay methods. These compounds may be converted into more active substances by the microbiological introduction of the 17-hydroxyl group as described below.

The compounds of the formula wherein $R_2$ is H, in general exhibit progestational properties and find utility in syndromes wherein progestational therapy is indicated. These compounds may be transformed into their corresponding C–21 hydroxylated analogs as well as their C–17 hydroxylated analogs, by means of microbiological processes described below. Thus, it may be seen that the compounds of our invention, all falling within the general formula of a 19-nor-pregnatriene, possess varying degrees of physiological activity and further, the compounds of the group, which are less active, pharmacologically, are convertible into the more active hydroxylated analogs.

The new compounds of our invention may be administered orally in the form of tablets, capsules and the like, topically in the form of ointments or creams, or parenterally in the form of aqueous or oily suspensions in non-toxic vehicles.

The compounds of our invention are conveniently prepared by subjecting a 19-nor-delta-4-3-ketopregnene, whose C and D rings possess the variable shown in the general formula, to the dehydrogenating action of *Corynebacterium simplex* (A.T.C.C. 6946) or *Corynebacterium hoagii* (A.T.C.C. 7005). For example, the microbiological action of the organism cited upon delta-4-19-norpregnene-17-alpha-21-diol-3,20-dione results in the formation of 1,3,5(10)-pregnatriene-3-17-alpha-21-triol-20-one.

A more detailed description of the culturing and incubating techniques used in preparing media and cultures of *Corynebacterium simplex* and *Corynebacterium hoagii* are fully described in copending applications of Arthur Nobile, No. 449,257 filed August 11, 1954, No. 464,159 filed October 22, 1954, No. 481,279 filed January 11, 1955, now United States Patent No. 2,837,464, June 3, 1958.

It is to be noted that the foregoing describes the preparation of the compounds of this invention from a starting steroid, whose C and D rings already possess the ultimately desired functional groups. However, it is possible to interconvert the compounds of the general formula into one another, especially with regard to the introduction of a hydroxyl function. For example, a compound of the general formula wherein $R_1$ is H, is convertible into its hydroxylated analog by means of analogous microbiological procedures employing a hydroxylating organism chosen from the genus Trichothecium, preferably the specie *T. Roseum*, as described in copending application of Hershel L. Herzog and Eugene P. Oliveto, Serial Number 484,588, filed January 27, 1955.

Similarly, the compounds of the general formula wherein $R_2$ is H, are convertible into their respective C–21 hydroxylated analogs according to microbiological procedures analogous to those described in copending application of Hershel L. Herzog and Eugene P. Oliveto, Serial Number 484,302, filed January 26, 1955, now United States Patent No. 2,874,172, February 17, 1959. In these procedures, a 21-hydroxyl group is introduced by means of the oxidizing action of a member of the genus Ophiobolus, specifically the specie *O. herbotrichus*. The hydroxyl function may be introduced singly, as indicated above, or, by employing the described methods consecutively, a hydroxyl function is introducible into both the 17- and 21-positions of a corresponding desoxy compound.

The foregoing transformations indicate methods for the interconversion of the compounds of this invention according to microbiological procedures. Alternatively, the compounds of the general formula which are devoid of an oxygen function at C–17 and/or C–21 may be transformed into their respectively oxygenated analogs according to chemical methods. For example, a compound of the general formula lacking a hydroxyl function at C-17 and C-21 such as 1,3,5(10)-19-nor-pregnatriene-3-ol-11, 20-dione, is convertible into its 17-alpha-hydroxy analog by means of the standard enol-acetylation reaction followed by treatment with a peracid, such as peracetic or perbenzoic acid. This hydroxylation step is well known in the art and is further known to be preferably applicable to compounds containing no substituent at C-21. From the foregoing reaction there is obtained 1,3,5(10) - nor - pregnatriene - 3,17 - alpha - diol - 11,20-dione which is convertible to its C-21-hydroxy analog by treatment with lead tetraacetate in the usual manner.

Alternatively, a compound of the general formula such as 1,3,5(10)-nor-pregnatriene-3,11-beta,21-triol is transformed into the corresponding 17-alpha-hydroxy analog by subjecting the triol to the standard cyanohydrin formation C-20, dehydration of the so-formed cyanohydrin to the delta-17,20 compound, followed by oxidation in the known manner with potassium permanganate or osmium tetroxide whereby the tetrol is obtained.

The following examples more fully describe methods for the preparation of the new compounds, but in no way limit this application except as defined in the appended claims.

EXAMPLE 1

*1,3,5(10)-19-nor-pregnatriene-3,11-beta-17-alpha-21-tetrol-20-one*

One hundred ml. of an 18-hour broth culture of Corynebacterium simplex (A.T.C.C. 6946), grown in a 0.1% yeast extract (Difco) medium containing 9.0 ml. of 0.2 M $KH_2PO_4$ and 9.0 ml. of 0.2 M $Na_2HPO_4$, are transferred aseptically to a sterile 300 ml. flask containing 25 mg. of 19-nor-delta-4-pregnene-11-beta-17-alpha-21-triol-3,20-dione dissolved in 0.25 ml. of methanol. The resulting mixture is shaken for 6 hours at 28°. The contents of the flask are then extracted thoroughly with chloroform whereupon the chloroform extracts are dried and concentrated. The residue is recrystallized from acetone-hexane yielding 14 mg. of 1,3,5(10)-19-nor-pregnatriene-3,11-beta-17-alpha-21-tetrol-20-one.

EXAMPLE 2

*1,3,5(10)-19-nor-pregnatriene-3,17-alpha-21-triol-11,20-dione*

By substituting 19-nor-delta-4-pregnene-17-alpha-21-diol-3,11,20-trione as the steroid substrate in Example 1, milligram for milligram, and following the procedure of Example 1, there is obtained 17 mg. of 1,3,5(10)-pregnatriene-3,17-alpha-21-triol-11,20-dione.

EXAMPLE 3

*1,3,5(10)-19-nor-pregnatriene-3,11-beta-21-triol-20-one*

The procedure of Example 1 is employed for the preparation of the compound of this example except that 1.0 ml. of ethanol is employed as the solvent and 25 mg. 19-nor-delta-4-pregnene-11-beta - 21 - diol-3,20-dione is employed as the steroid substrate. There is obtained 10 mg. of the 1,3,5(10)-19-nor-pregnatriene-3,11-beta-21-triol-20-one after recrystallization from acetone-hexane.

EXAMPLE 4

*1,3,5(10)-19-nor-pregnatriene-3,21-diol-11,20-dione*

In a manner similar to that described in the preceding example, using 19-nor-delta-4-pregnene-3,11,20-trione-21-ol, there is obtained the compound of this example in an 11 mg. yield after recrystallization from acetone-hexane.

EXAMPLE 5

*1,3,5(10)-19-nor-pregnatriene-3,11-beta-17-alpha-triol-20-one*

A yeast extract medium, as described in Example 1, is sterilized by autoclaving for 15 minutes at 120° and to the sterile medium, there is added 1 ml. of a 1% suspension of Corynebacterium hoagii (A.T.C.C. 7005). The flask and its contents are incubated for 24 hours at 28°.

To a second 300 ml. flask are added 2 ml. of ethanol and 25 mg. of 19-nor-delta-4-pregnene-11-beta-17-alpha-diol-3,20-dione. The 24-hour growth culture is transferred aseptically to the flask containing the steroid and the mixture is incubated at 28° for 10 hours while shaking. At the end of the incubation period, the reaction mixture is thoroughly extracted with chloroform and the extracts are concentrated to a residue. Recrystallization from acetone-hexane yields 8 mg. of 1,3,5(10)-19-nor-pregnatriene-3,11-beta-17-alpha-triol-20-one.

EXAMPLE 6

*1,3,5(10)-19-nor-pregnatriene-3,17-alpha-diol-11,20-dione*

By employing 19-nor-delta-4-pregnene-17-alpha-ol-3,11,20-trione as substrate in the preceding example, there is obtained 9 mg. of the compound of this example after recrystallization from acetone-hexane.

EXAMPLE 7

*1,3,5(10)-19-nor-pregnatriene-3,11-beta-diol-20-one*

The microbiological action of Corynebacterium hoagii (A.T.C.C. 7005) upon 19-nor-delta-4-pregnene-11-beta-ol-3,20-dione, according to the procedure of Example 5, affords 12 mg. of 1,3,5(10)-19-nor-pregnatriene-3,11-beta-diol-20-one.

EXAMPLE 8

*1,3,5(10)-19-nor-pregnatriene-3-ol-11,20-dione*

By employing 25 mg. of 19-nor-delta-4-pregnene-3,11,20-trione as substrate in the procedure described in Example 7, the compound of this example is obtained as a crystalline material after purification by recrystallization from acetone-hexane.

EXAMPLE 9

*1,3,5(10)-19-nor-pregnatriene-3,11-beta-17-alpha-21-tetrol-20-one-11,21-diacetate*

By employing 19-nor-delta-4-pregnene-11-beta-17-alpha-21-triol-3,20-dione-11,21-diacetate in the procedure described in Example 1, the diester of this example is obtained.

EXAMPLE 10

*1,3,5(10)-19-nor-pregnatriene-3,17-alpha-21-triol-11,20-dione-21-acetate*

Utilizing the 21-acetate corresponding to the substrate in Example 2, the ester of this example is obtained.

EXAMPLE 11

*1,3,5(10)-19-nor-pregnatriene-3,21-diol-11,20-dione 3,21-diacetate*

From the reaction of the compound obtained in Example 4 with acetic anhydride in pyridine, there is obtained the diester of this example.

We claim:
1. 19-nor-pregnatrienes of the formula:

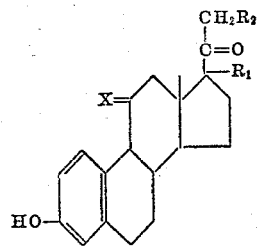

wherein X is a member of the group consisting of

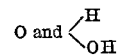

$R_1$ is a member of the group consisting of H and OH and $R_2$ is a member of the group consisting of H, OH and lower aliphatic acyloxy.

2. 1,3,5-(10)-19-nor-pregnatriene 2,11-beta-17-alpha-21-tetrol-20-one.

3. 1,3,5 - (10) - 19 - nor - pregnatriene 3,17 - alpha - 21-triol 11,20-dione.

4. 1,3,5 - (10) - 19 - nor - pregnatriene 3,11 - beta - 21-triol-20-one.

5. 1,3,5 - (10) - 19 - nor - pregnatriene 3,21 - diol 11,20-dione.

6. 1,3,5 - (10) - 19 - nor - pregnatriene 3,11 - beta-17-alpha-triol 20-one.

7. 1,3,5 - (10) - 19 - nor - pregnatriene 3,17 - alpha - diol-11,20-dione.

8. 1,3,5 - (10) - 19 - nor - pregnatriene 3,11 - beta - diol-20-one.

9. 1,3,5 - (10) - 19 - nor - pregnatriene - 3 - ol - 11,20 - dione.

10. 1,3,5 - (10) - 19 - nor - pregnatriene - 3,11 - beta - 17-alpha-21-tetrol 20-one 11,21-diacetate.

11. 1,3,5 - (10) - 19 - nor - pregnatriene 3,17 - alpha - 21-triol-11,20-dione-21-acetate.

12. 1,3,5 - (10) - 19 - nor - pregnatriene - 3,21 - diol - 11,20-dione-3,21-diacetate.

References Cited in the file of this patent

UNITED STATES PATENTS

| 2,280,828 | Inhoffen | Apr. 28, 1942 |
| 2,649,400 | Murray | Aug. 18, 1953 |
| 2,691,029 | Hanzl | Oct. 5, 1954 |
| 2,691,300 | Murray | Oct. 5, 1954 |
| 2,694,080 | Colton et al. | Nov. 9, 1954 |

FOREIGN PATENTS

| 926,552 | Germany | Mar. 24, 1955 |
| 683,900 | Great Britain | Dec. 10, 1952 |
| 745,636 | Great Britain | Feb. 26, 1956 |